UNITED STATES PATENT OFFICE.

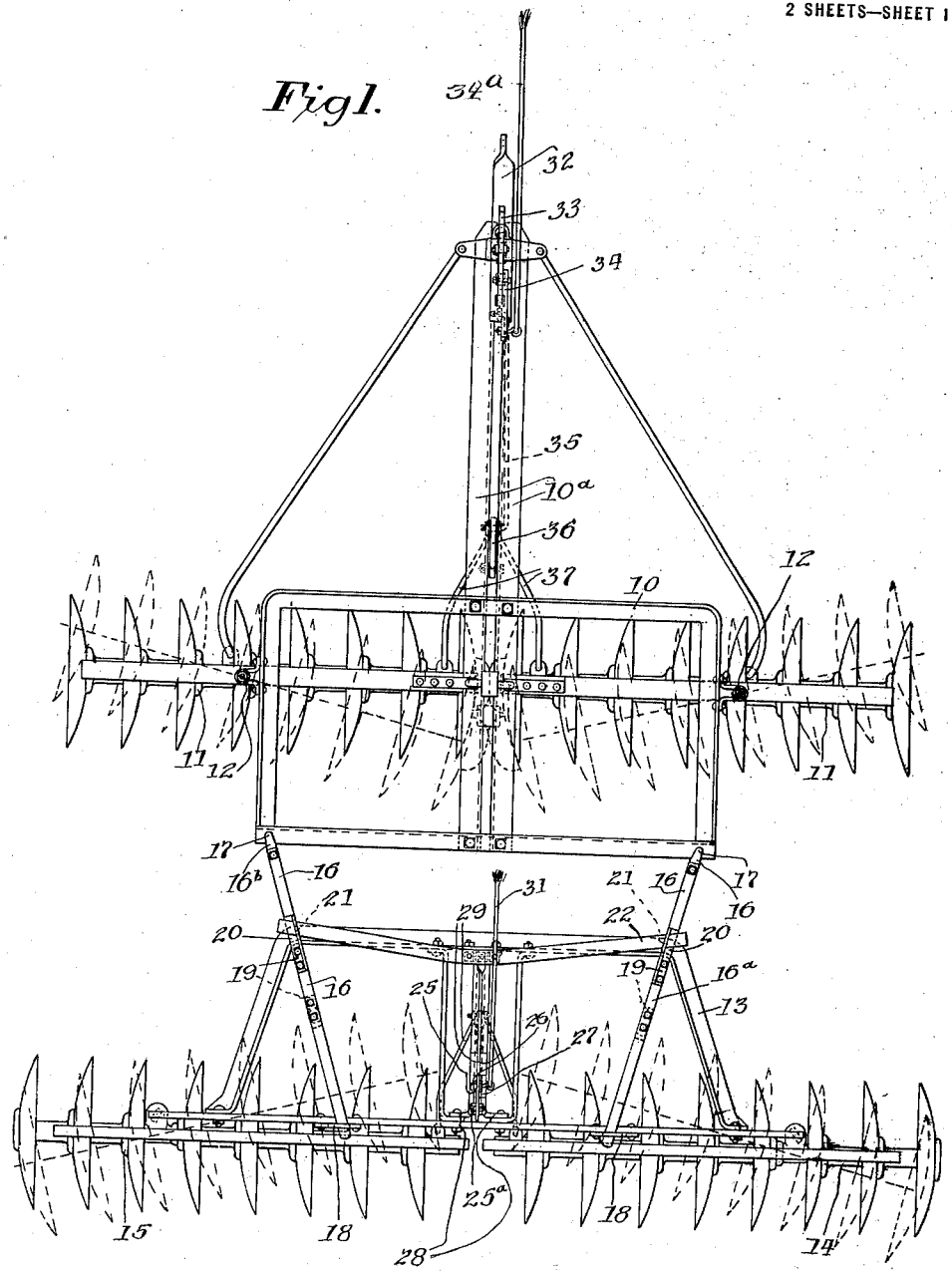

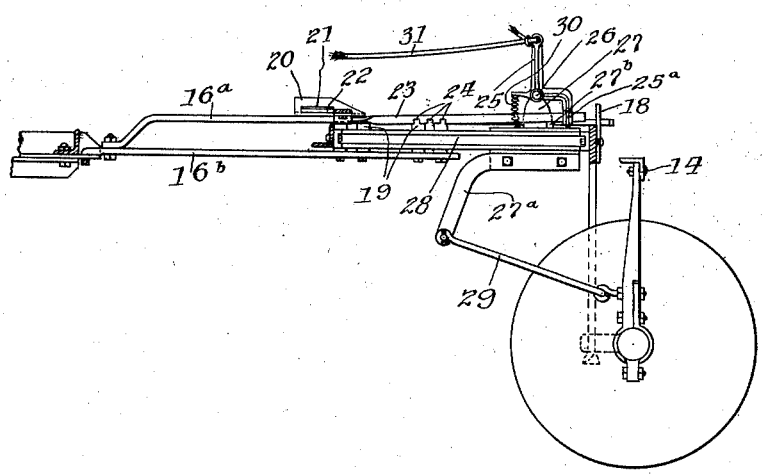
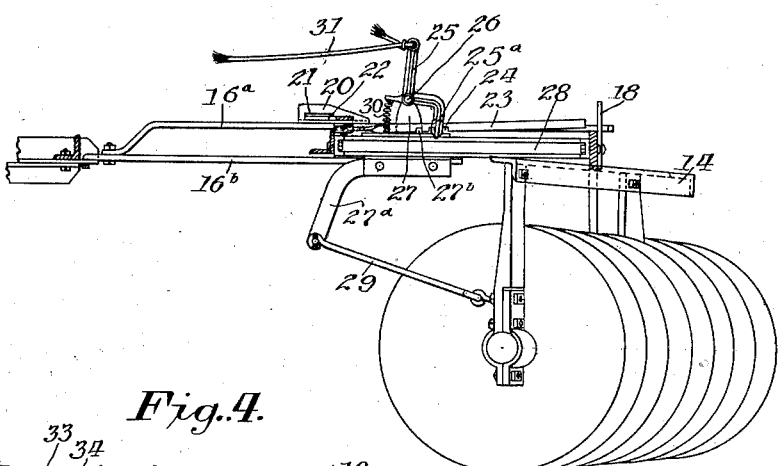
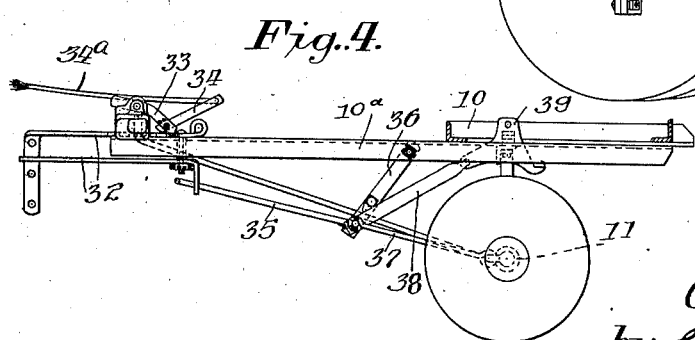

CHARLES S. SHARP, OF AUBURN, NEW YORK, ASSIGNOR TO INTERNATIONAL HARVESTER COMPANY, A CORPORATION OF NEW JERSEY.

TRACTOR DISK HARROW.

1,334,562.   Specification of Letters Patent.   Patented Mar. 23, 1920.

Application filed November 22, 1918. Serial No. 263,716.

*To all whom it may concern:*

Be it known that I, CHARLES S. SHARP, a citizen of the United States, residing at Auburn, in the county of Cayuga and State of New York, have invented certain new and useful Improvements in Tractor Disk Harrows, of which the following is a full, clear, and exact specification.

This invention relates to harrows and especially to double disk harrows.

An object of this invention is to provide in a double harrow, means for angling and straightening the gangs of the rear harrow section independently of the front section by the action of the harrow in backing and in going forward.

Another object is to provide means under control of the operator from a tractor for independently angling or straightening the gangs of both front and rear units of a double harrow.

Another object is to provide means for angling and straightening the gangs of front and rear harrow units without the use of hand levers to perform the operation.

Another object is to provide an independent rear harrow unit which can be attached to another implement as a drill, other harrow, etc., and which will automatically straighten in backing or turning and which will automatically angle on going ahead.

These and other objects which will be apparent from the specifications, are accomplished by my invention which comprises a harrow preferably having front and rear units, draft members connecting said units, and means operable by said draft members for angling the rear gangs.

Referring now to the drawings in which like numerals represent like parts throughout,—

Figure 1 is a plan view of a double harrow embodying my invention;

Fig. 2 is a partial longitudinal section through the rear harrow section showing the gangs straight;

Fig. 3 is the same but with the gangs angled; and

Fig. 4 is a similar view of the front section with the gangs straight.

The harrow embodying my invention comprises a front section having a frame 10 to which disk gangs 11 are hingedly mounted at 12, and a rear section having a frame 13 on which are hingedly mounted two disk gangs 14 and 15.

The front and rear sections are connected by draft members 16 which are hingedly connected to the front section at 17 and which are each preferably made up of two bars 16$^a$ and 16$^b$ one of which lies above the rear frame 13 while the other lies below it, and the upper bar 16$^a$ is slidably mounted on the rear of the frame through a loop 18. Blocks 19 lie between the bars 16$^a$ and 16$^b$, pull up into the front corners of the rear frame, and take the pull off the rear section.

Cleats 20 secured to the draft members 16 have slots 21 in which slide the ends of the equalizing bar 22. At the center of this bar is hingedly attached a latch bar 23 having a series of notches 24 near the forward end. This latch bar is slidable through an eye 25$^a$ in a bell crank 25 hinged at 26 to the block 27 which is slidably mounted on the guide bars 28 which form a part of the rear frame.

This block has suitably mounted thereon an arm 27$^a$, the forward end hingedly carrying two links 29 which are further hingedly connected to the inner ends of the rear gangs 14. The block 27 has a lug 27$^b$ against which the bar 23 is normally pressed by the spring 30 acting through the bell crank 25. A cord 31 attached to the bell crank leads to the driver's seat. Let us begin with the elements in the position shown in Fig. 2. It will be seen that as the harrow is backed the two sections will be brought near each other, due to the telescoping action of the sliding draft members 16. This will cause the equalizing bar 22 and the latch bar 23 to slide over the lug 27$^b$ until one of the notches 24 is reached, when it will latch and carry the block 27 and the inner ends of the rear gangs back with it, thereby straightening the gangs.

If the harrow is now pulled forward, the block, and hence the inner ends of the rear gangs, will be pulled forward and the rear gangs angled, the amount of angle depending upon the notch 24 in which the lug 27$^b$ is placed. This adjustment is accomplished by manipulation of the cord 31 by the operator either in backing or in going ahead.

The draft angles 10$^a$ of the front frame carry sliding draft bars 32 which are normally held locked against pull by the spring actuated detent 33. The detent may be released by the operator of the tractor while going ahead, by a pull on the trip rod 34 to accomplish the straightening of the front gangs. The angle of the front gangs may be set automatically by backing due to the ratchet action of the detent.

A link 35 is arranged to slide through the downturned end of the lower draft bar 32 and is attached at the other end to the lever 36 which is hingedly mounted on the frame. Links 37 are also attached to this lever and to the inner ends of the gangs. Another link 38 is also attached to the lever and to the guide block 39 which slides on the front frame and regulates the depth of the inner ends of the front gangs.

It will therefore be seen that I have invented a double disk harrow whose front and rear sections act independently in the manner of angling and straightening the gangs. The front gangs automatically set an angle in backing and assume the angle so set in going forward. The rear gangs automatically straighten in backing but set the parts so that an angle is taken when the harrow is next advanced.

Either the front or rear gangs, or both, may be straightened separately in going ahead by pulls on the trip ropes 31 and 34ª, and by carefully operating these ropes either set of gangs may be straightened by jumping back latch bar 23 a notch at a time.

The rear section alone may be removed and attached to other implements as grain drills, other forms of harrows, etc.

While I have shown and described but a single form of my invention, it is to be understood that it is capable of many modifications. Changes, therefore, in the construction and arrangement of parts may be made which do not depart from the spirit and scope of the invention as disclosed in the appended claims.

1. In a harrow unit, a frame, disk gangs thereon, means for connecting said frame with another implement, and means associated with said connecting means and controllable from a distance for controlling the angle of the gangs.

2. In a harrow unit, a frame, disk gangs thereon, draft members connected to said frame, means associated with said draft members for automatically controlling the angle of the gangs while the harrow is in operation, and control means operable from a distance.

3. In a harrow unit, a frame, disk gangs thereon, means for connecting said frame with another implement, and means associated with said first means for automatically controlling the angle of the gangs while the harrow is in operation, and control means operable from a distance.

4. In a harrow unit, a frame, disk gangs thereon, draft members connected to said frame, means associated with said draft members for automatically controlling the angle of the gangs while the harrow is in operation, and control means operable from a distance.

5. In a double disk harrow, front and rear sections, gangs on said sections, a connection between said sections, and means associated with said connection for automatically controlling the angle of the rear gangs by movement of said connection.

6. In a harrow unit, a frame, disk gangs thereon, telescopic draft members connected to said frame, means associated with said draft members for automatically controlling the angle of the gangs during the operation of backing and turning.

7. In a harrow unit, a frame, disk gangs thereon, spaced draft members connected to said frame, means associated with said draft members for automatically controlling the angle of the gangs, said means including a cross member connecting said draft members.

8. In a harrow unit, a frame, disk gangs thereon, spaced draft members connected to said frame, means associated with said draft members for automatically controlling the angle of the gangs, said means including a cross member connecting said draft members and rods between said cross member and the inner ends of said gangs.

9. In a harrow unit, a frame, disk gangs thereon, spaced draft members connected to said frame, means associated with said draft members for automatically controlling the angle of the gangs, said means including a cross member connecting said draft members, a sliding block on the frame connected to the gangs, and means for operatively connecting the sliding block and the cross member.

10. In a harrow unit, a frame, disk gangs thereon, spaced draft members connected to said frame, means associated with said draft members for automatically controlling the angle of the gangs, said means including a cross member connecting said draft members, a sliding block on the frame connected to the gangs and means for automatically connecting the sliding block and the cross member.

11. In a harrow unit, a frame, disk gangs thereon, spaced draft members connected to said frame, means associated with said draft members for automatically controlling the angle of the gangs, said means including a cross member connecting said draft members, a sliding block on the frame connected to the gangs, means for operatively connecting the sliding block and the cross member, and control means for releasing said sliding block from the cross member.

12. In a harrow unit, a frame, disk gangs thereon, spaced draft members connected to said frame, means associated with said draft members for automatically controlling the angle of the gangs, said means including a cross member connecting said draft members, a sliding block on the frame connected to the gangs, means for automatically connecting the sliding block and the cross member, and control means for releasing said sliding block from the cross member.

13. In a harrow unit, a frame, disk gangs thereon, spaced draft members connected to said frame, means associated with said draft members for automatically controlling the angle of the gangs, said means including a cross member connecting said draft members, a sliding block on the frame connected to the gangs, means for operatively connecting the sliding block and the cross member, and control means including an element operable from a point outside the harrow for releasing said sliding block from the cross member.

14. In a harrow unit, a frame, disk gangs thereon, spaced draft members connected to said frame, means associated with said draft members for automatically controlling the angle of the gangs, said means including a cross member connecting said draft members, a sliding block on the frame connected to the gangs, means for automatically connecting the sliding block and the cross member, and control means including an element operable from a point outside the harrow for releasing said sliding block from the cross member.

15. In a double disk harrow, front and rear sections, connecting means between said sections permitting them to approach each other, the rear section having a frame, disk gangs hingedly mounted thereon, a rod movable by said connecting means, and means connecting said rod and said disk gangs whereby the gangs may be swung by the relative movement of the front and rear sections.

16. In a double disk harrow, front and rear sections, connecting means between said sections permitting them to approach each other, the rear section having a frame, disk gangs hingedly mounted thereon, a rod movable by said connecting means, and means connecting said rod and said disk gangs whereby the gangs may be straightened on backing.

17. In a double disk harrow, front and rear sections, connecting means between said sections permitting them to approach each other, the rear section having a frame, disk gangs hingedly mounted thereon, a rod movable by said connecting means, and means connecting said rod and said disk gangs whereby the gangs may be straightened on backing and angled by a forward pull.

18. In a double disk harrow, front and rear sections, connecting means between said sections permitting them to approach each other, the rear section having a frame, disk gangs hingedly mounted thereon, a rod movable by said connecting means, means connecting said rod and said disk gangs whereby the gangs may be straightened on backing, means for locking said gangs in a straightened position and control means for releasing said gangs.

19. In a double disk harrow, front and rear sections, connecting means between said sections permitting them to approach each other, an angling member connected to said connecting means, the rear section having a frame, disk gangs hingedly mounted thereon, a block movable on the frame and operatively connected to the inner ends of the disk gangs, and means operatively connecting said angling member and said block for controlling the angling of the gangs.

20. In a double disk harrow, front and rear sections, connecting means between said sections permitting them to approach each other, a bar connected to said connecting means, the rear section having a frame, disk gangs hingedly mounted thereon, a block movable on the frame and operatively connected to the inner ends of the disk gangs, and means operatively connecting said bar and said block for controlling the angling of the gangs.

21. In a harrow, front and rear harrow units, disk gangs on said units, means connecting said units, independent means operable by the draft power for setting the angle in each set of gangs by backing, and independent means for putting the gangs into angle by a pull.

22. In a harrow, front and rear harrow units, disk gangs on said units, means connecting said units, independent means operable by the draft power for setting the angle in each set of gangs by backing and then putting the gangs into angle by a pull, and means for releasing either set of disks independently.

23. In a harrow, front and rear harrow units, disk gangs on said units, telescopic means connecting said units, an equalizing bar carried by said telescopic means, and means connecting said bar and the rear disk gangs for causing them to take and hold an angled position.

24. In a harrow, front and rear harrow units, disk gangs on said units, telescopic means connecting said units, an equalizing bar carried by said telescopic means, means connecting said bar and the rear disk gangs for causing them to take and hold an angled position, and means for releasing the gangs when the harrow is moving forward.

25. In a harrow, front and rear harrow units, disk gangs on said units, telescopic means for connecting said units, an equalizing bar carried by said telescopic means, and means connecting said bar and the rear disk gangs for causing them to take and hold an angled position, said equalizing bar tending to strengthen the rear gangs when backing or when turning.

26. In a harrow, front and rear harrow units, disk gangs on said units, telescopic means for connecting said units, an equalizing bar carried by said telescopic means, means connecting said bar and the rear disk gangs for causing them to take and hold an angled position, and means for releasing the gangs when the harrow is moving forward, said equalizing bar tending to straighten the rear gangs when backing or when turning.

27. An attachment for farming implements comprising a frame, disk gangs thereon, means for controlling the angling of said gangs from a point outside the harrow, and means for automatically straightening said gangs in backing.

28. An attachment for farming implements comprising a frame, disk gangs thereon, means controlled from a point outside the harrow for angling said gangs on a forward pull, and means for automatically straightening said gangs in backing.

29. A disk harrow attachment for implements comprising a frame, disk gangs carried thereby, telescopic members on said frame for connecting to said implements a bar carried by said telescopic members, and connections between said bar and said gangs so that the movement of the bar causes the gangs to angle.

30. A disk harrow attachment for implements comprising a frame, disk gangs carried thereby, telescopic members on said frame for connecting to said implements a bar carried by said telescopic members, connections between said bar and said gangs so that the movement of the bar causes the gangs to angle, and means operable from a tractor for disengaging said gangs from said bar.

31. In a double disk harrow, front and rear sections, gangs thereon, control means including an element operable from a point outside the harrow for angling or straightening the gangs of each section independently of the other.

32. In a double disk harrow, front and rear sections, gangs thereon, control means including an element operable from a point outside the harrow for angling the gangs of each section independently of the other.

33. In a double disk harrow, front and rear sections, gangs thereon, control means including an element operable from a point outside the harrow for straightening the gangs of each section independently of the other.

34. In a harrow, front and rear harrow units, disk gangs on said units, means connecting said units, separate means operable by the draft power for setting the angle in each set of gangs independent of each other by backing, and separate means for putting the gangs into angle by a pull.

35. In a harrow, front and rear harrow units, disk gangs on said units, means connecting said units, separate means operable by the draft power for setting the angle in each set of gangs by backing and then putting the gangs into angle by a pull, and means for releasing either set of gangs independently.

In testimony whereof I affix my signature.

CHARLES S. SHARP.